(12) United States Patent
Henry et al.

(10) Patent No.: US 7,309,267 B1
(45) Date of Patent: Dec. 18, 2007

(54) INTEGRATED FLOAT RAFT

(75) Inventors: Brian T. Henry, Brick, NJ (US); Thomas W. Swierkocki, Manasquan, NJ (US); Jonathan Vezzosi, Toms River, NJ (US); Brian Gibson, Browns Mills, NJ (US)

(73) Assignee: Air Cruisers Company, Wall, NJ (US)

( * ) Notice: Subject to any disclaimer, the term of this patent is extended or adjusted under 35 U.S.C. 154(b) by 0 days.

(21) Appl. No.: 11/527,337

(22) Filed: Sep. 25, 2006

(51) Int. Cl.
*B63B 35/58* (2006.01)

(52) U.S. Cl. .......................................... 441/40; 244/107

(58) Field of Classification Search .................. 441/40, 441/41, 42; 114/345, 365; 244/107
See application file for complete search history.

(56) References Cited

U.S. PATENT DOCUMENTS

| | | | |
|---|---|---|---|
| 2,933,739 A | 4/1960 | Miller et al. | |
| 4,083,070 A | 4/1978 | Martin | |
| 4,614,500 A | 9/1986 | Miller | |
| 4,655,415 A * | 4/1987 | Miller et al. | 244/107 |
| 6,685,520 B1 | 2/2004 | Wiggins | |
| 6,709,305 B2 * | 3/2004 | Parrott et al. | 441/40 |
| 6,941,887 B2 | 9/2005 | Monlezun | |
| 7,115,010 B2 * | 10/2006 | Parrott et al. | 441/40 |

* cited by examiner

*Primary Examiner*—Lars A. Olson
(74) *Attorney, Agent, or Firm*—Lawrence G. Fridman

(57) ABSTRACT

An emergency floatation system associated with a landing gear of a rotorcraft comprising at least a float unit and a raft module. The float unit is formed by a base and a float cover with an inflatable float being positioned therebetween. The raft module is formed with a raft compartment adapted to receive an inflatable raft in the packed condition thereof. The raft module is supported on the float by the base. The raft is adapted for inflation and deployment from the raft module independently of the float deployment.

20 Claims, 11 Drawing Sheets

INTEGRATED FLOAT RAFT

FIELD OF THE INVENTION

This invention relates in general to emergency floatation devices, and in particular, it relates to external rotorcraft floatation devices.

BACKGROUND OF THE INVENTION

Certain types of aircraft such a commercial fixed wing aircraft and rotorcraft such as, for example, helicopter-type aircraft, are required by federal regulatory agencies to carry inflatable floatation devices for passenger safety in the event of an emergency while flying over water. In the rotorcrafts, floatation devices and systems have also been employed in order to enable the craft to land on water in emergency situations, when, for example, the rotorcraft loses power. Such systems provide passengers with extra critical time before the rotorcraft sinks. Such emergency floatation systems typically include multiple emergency floatation devices mounted to the rotorcraft landing gear.

Various prior art floatation devices have been used to support vehicles such as a helicopter on a water surface. Early float assemblies include cylindrical shaped float tubes which are inflatable through the use of compressed air and controlled by the pilot. A float is attached to each skid of the helicopter allowing the craft to land and for the occupants to evacuate, and in some cases, rescue the helicopter as well.

Helicopters flying over water typically also carry a life-raft. Before exiting the aircraft, the crew must locate and remove the inflatable rafts. After exiting the aircraft, the rafts are inflated. In case of an emergency water landing, it is typical for the pilot to initially activate the floats, land on water, and then to deploy the life-raft where the passengers wait until rescued.

The life-raft is typically stored on the rear seat of the aircraft. The internally stowed inflatable rafts must be located, removed, and activated by the crew, taking precious time during an emergency situation. A further complication is that helicopters typically have only three rear seats for passengers and one of these seats must be filled with the life-raft. Safety regulations dictate that nothing may be placed under the seats. Further, the raft cannot be stowed in a luggage compartment because it must be readily accessible when egressing in an emergency.

Positioning of the inflatable raft outside of the helicopter or rotorcraft eliminates the necessity of manually ejecting the raft from the interior of the craft prior to the required inflation. This avoids major difficulties which might exist during the emergency situations and saves valuable time.

An external life-raft and floatation device combination applicable for use with rotorcraft is known in the art and has been disclosed by U.S. patent is U.S. Pat. No. 6,709,305. However, the device of this patent is limited because the life-raft forms an inseparable combination within the floatation device itself. Since the raft is contained inside the float pack, the float must be inflated first followed by the deployment of the raft. This is a substantial drawback of this prior art device and can be clearly seen when a pilot inadvertently inflates the life-raft first, thus possibly preventing deployment of the float and damaging to the system. In the context of an emergency landing, this limitation of the prior art design can be costly to the rescue efforts of the survivors and the helicopter. Furthermore, this prior art arrangement virtually prevents independent deployment of the life-raft without actuation of the respective floats. By way of example, the ability to deploy the raft without activation of the floats is important when making an emergency landing on an unstable oil rig or platforms where the floats are not necessary but the life-rafts are often needed. Another substantial drawback of the emergency evacuation device of U.S. Pat. No. 6,709,305 is that it provides an inseparable and pre-packaged arrangement combining the float and the life-raft. Thus, it cannot be readily utilized for retrofitting an existing float system by adding a life-raft module.

In view of the above, it has been a long felt unsolved need to provide an external floatation device system for a rotorcraft, where the life-raft and floatation device can be operated independently from each other. There is also a need for a life-raft module which can be used for retrofitting an existing float system, so as to eliminate the necessity of providing a rotorcraft with a new and costly float system. Thus, the system of the invention provides a pilot with maximum available options to cover more eventualities in the event of an emergency rotorcraft landing. It is an essential feature of the invention that the life-raft can be deployed without the floats, and the floats can be activated without deployment of the life-rafts.

SUMMARY OF THE INVENTION

This invention allows a life-raft to be installed at the exterior of the existing emergence flotation device. In the first embodiment of the invention, a distinctly separate raft module is mounted at the exterior of the existing floats. The raft module is attached to an outside cover of existing floats and is fastened by a retention arrangement to the floats. As the float expands, the retention arrangement or strappings hold the raft in place until the passenger or pilot activates the life-raft.

According to the second embodiment of the emergency floatation system, the raft module is permanently connected to the float at the bottom part of the base plate. In this manner, an inseparable integral structure is formed between the raft module and the float unit. In spite of being integrated in one structural system, each inflatable is capable of independent deployment. Either the float disposed within the float compartment or the raft disposed within the raft compartment can be deployed independently of each other. Unlike the available prior art arrangements which are adapted for maintaining both floats and rafts in the same container, in the system of the invention, the float deployment and raft deployment are independent operations.

An essential feature of the system of the invention is that the raft is positioned outside of the float unit. Thus, if the float fails to activate, the raft can be independently activated or removed. In the prior art system, failure to activate or deploy the float would cause an inability to deploy, activate, and utilize the raft. Furthermore, in the prior art, mounting of the raft module on an already existing float system requires significant modification to the aircraft and comes with significant expense.

The integrated float-raft system of the invention provides simplified means for mounting inflatable emergency life-rafts at the exterior of a rotorcraft or helicopter. Unlike other external raft designs of the prior art, the integrated float-raft system of the invention provides the ability to mount the inflatable rafts directly onto the exterior of the inflatable floats. The inflatable floats and rafts are installed on aircraft as independent components and utilize simple installation methods. During deployment of the inflatable float, the raft module remains separated from the float unit and is attached to the float unit by means of a retention arrangement, such as retention straps, adhesives, etc. After the floats are inflated, the rafts can be deployed using a separate activation means. Following activation, the rafts are expelled from the raft modules.

Unlike known prior art arrangements which pack both the deflated floats and deflated rafts inside a single cover, the integrated float-raft system of the invention uses a raft module which is distinctly independent of the float unit. The essential advantage to the integrated float-raft system of the invention is that the inflatable floats and rafts operate as separate entities. Additionally, the integrated float-raft system of the invention is easily adaptable to the existing and already certified inflatable floatation arrangements.

BRIEF DESCRIPTION OF THE DRAWINGS

The following description of the preferred embodiment will be best understood when considered in conjunction with the accompanying drawings wherein.

DESCRIPTION OF THE PREFERRED EMBODIMENT

Figure 1:
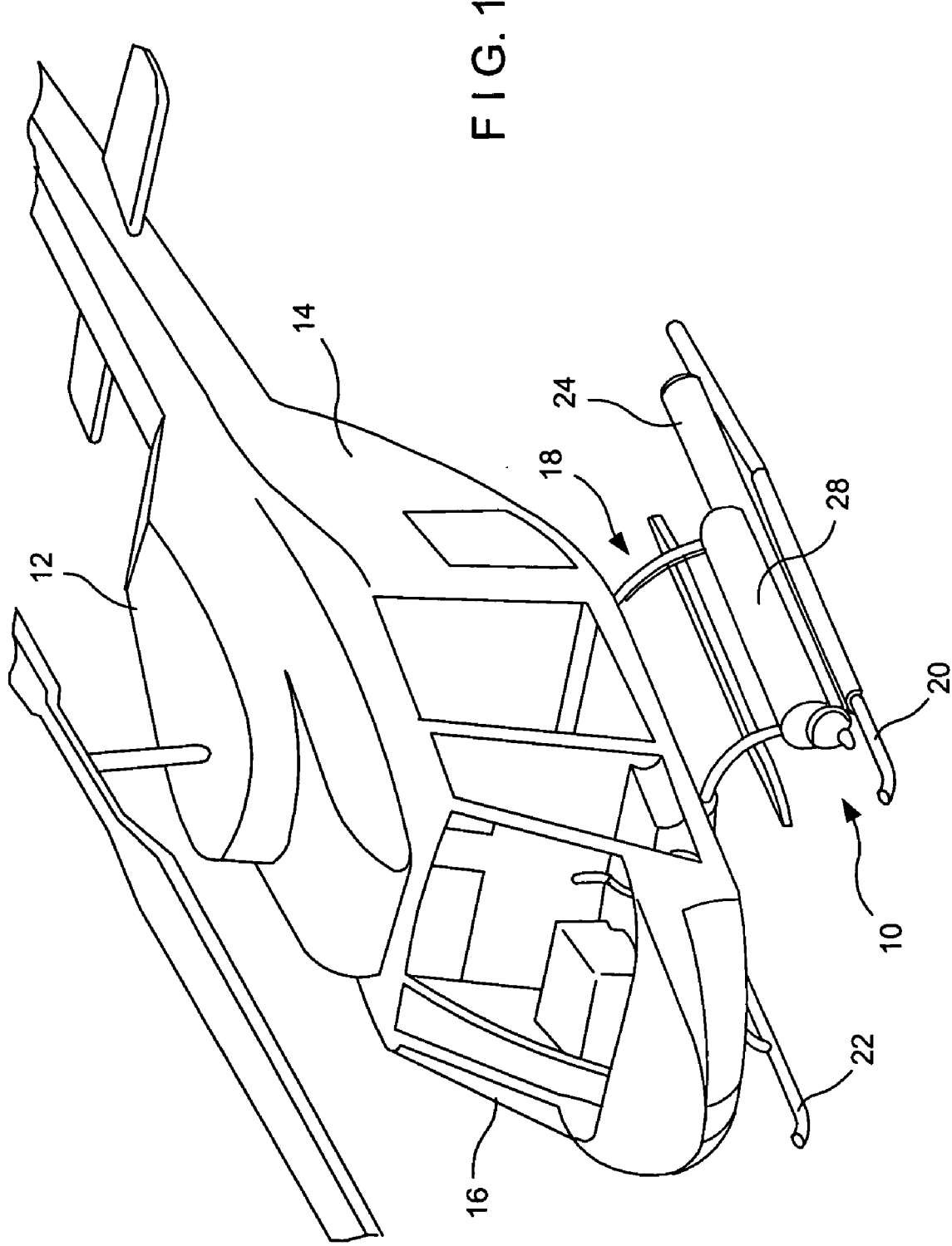
FIG. 1 illustrates a rotorcraft having an emergency floatation system of the invention in a packed condition.
Figure 2:
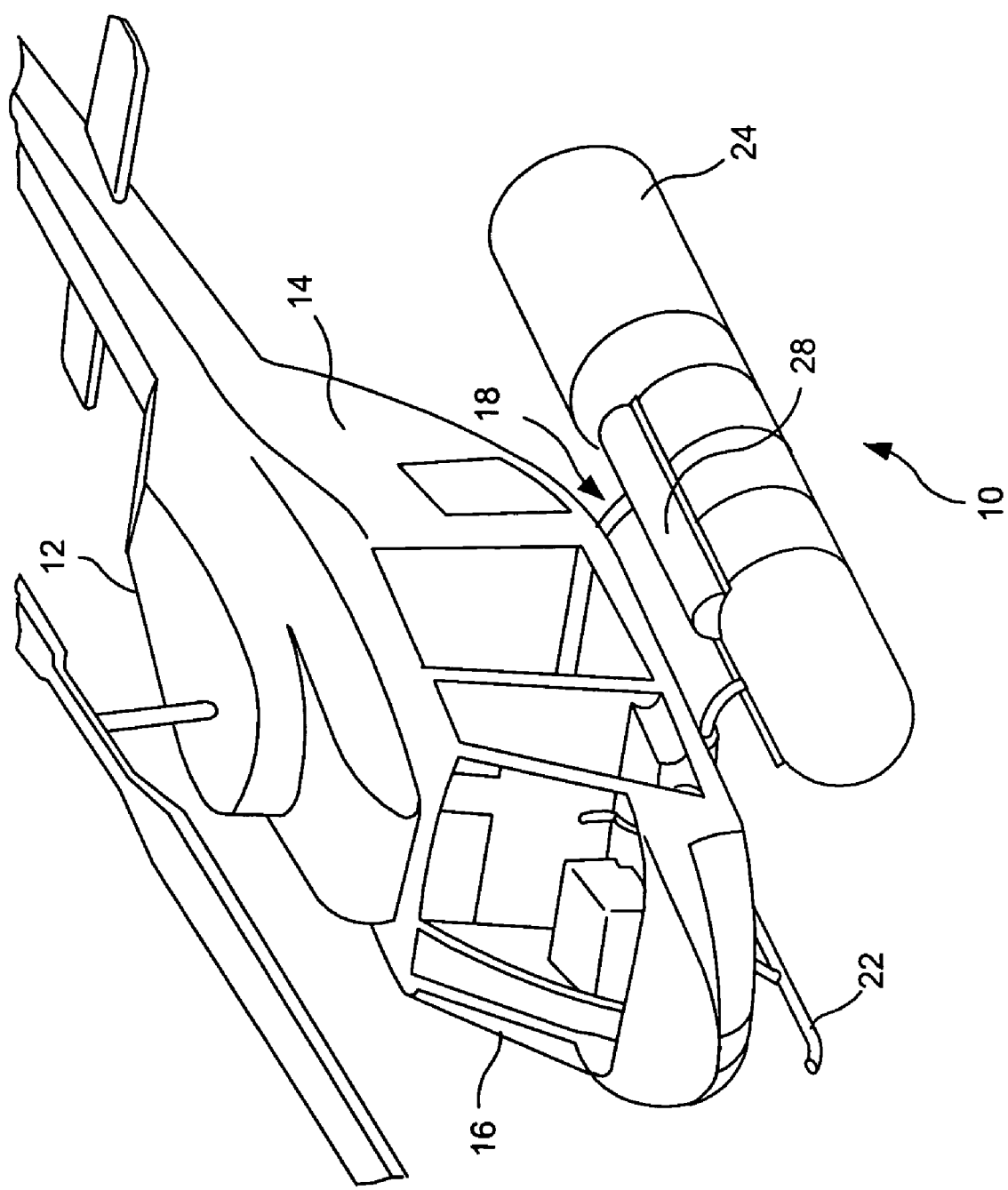
FIG. 2 illustrates a rotorcraft with the emergency floatation system of the invention having a float in a deployed condition.
Figure 3:
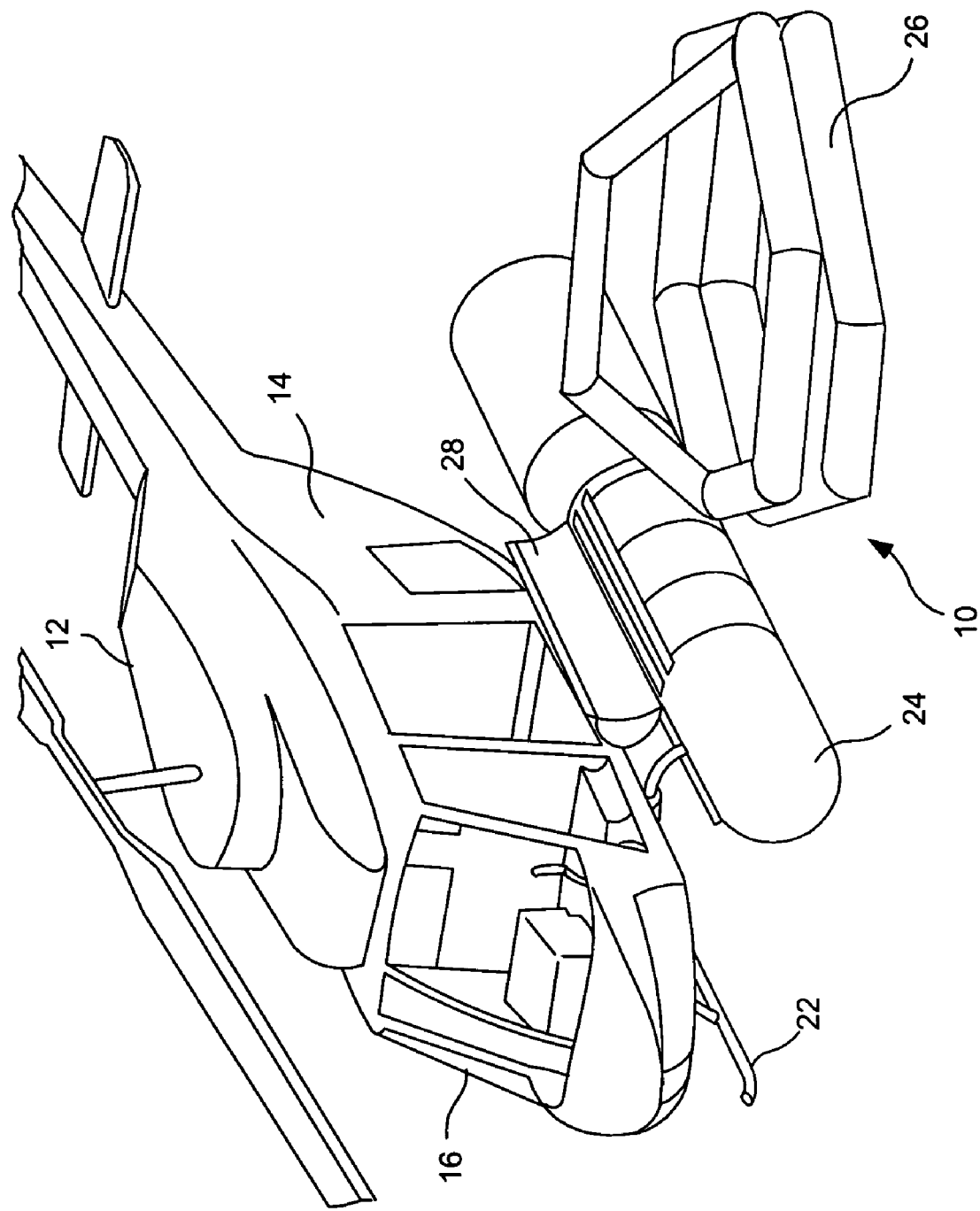
FIG. 3 illustrates the emergency floating system of the invention having the float and the life-raft in a fully deployed condition.

Referring now to the drawings in general and to FIGS. 1-3, specifically, wherein a helicopter or rotorcraft-type aircraft 12 employing the emergency floatation system 10 in accordance with exemplary embodiments of the invention is illustrated. The rotorcraft 12 includes a main body 14 with a cockpit 16, and a landing structure 18, having a first landing skid 20 and a second landing skid 22 extending along a longitudinal axis of the rotorcraft and adapted to engage the ground when not in flight.

A pair of emergency floatation devices or inflatable floats 24 are connected to the first and second landing skids 20 and 22, respectively. It will be understood that more or less floatation devices can be provided on each leg of the landing structure 18. At least one inflatable life-raft module 28 is associated with each float. It will be discussed hereinbelow in substantial detail that the integrated emergency float-raft system 10 of the invention provides a simplified mounting arrangement by which the inflatable raft modules 28 are associated with the exterior of the respective inflatable floats 24. FIG. 1 depicts the integrated system 10, wherein the floats 24 and the respective raft modules 28 are in stowed or non-deployed condition. Since the raft modules are independent from the respective floats, the floats can be independently deployed such that the raft is uninflated and no damage is caused to any elements of the system. This condition of the system 10 is illustrated in FIG. 2. The system 10 of the invention with the fully deployed life-raft 26 is illustrated in FIG. 3. As is apparent from this figure, the life-raft 26 is deployed from the inflated float 24 and is positioned on the port side, away from the structural elements of the rotorcraft. Such location simplifies boarding of the passengers.

Figure 4:
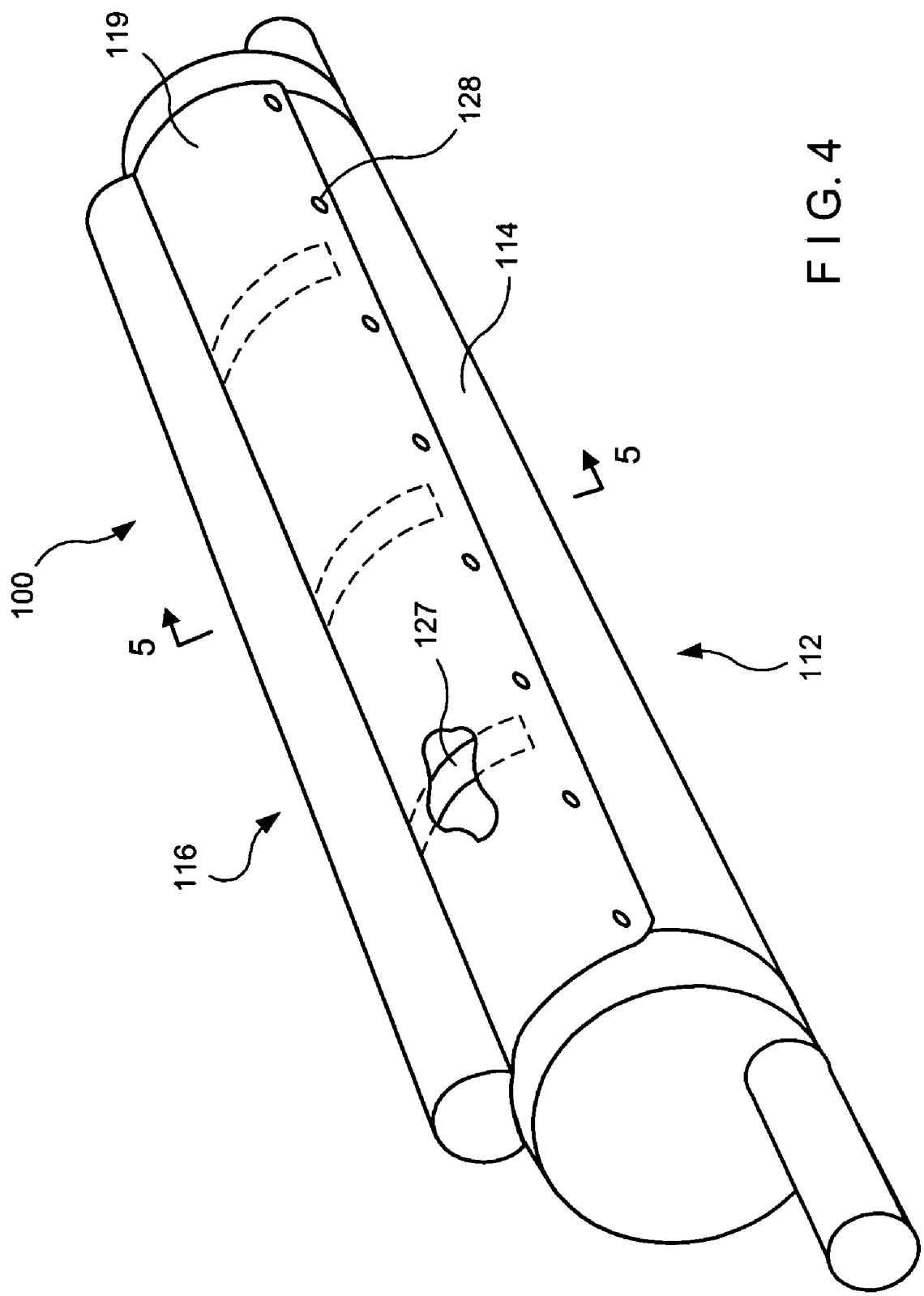
FIG. 4 is a semi-perspective view illustrating one embodiment of the emergency floatation system of the invention in the packed condition.
Figure 5:
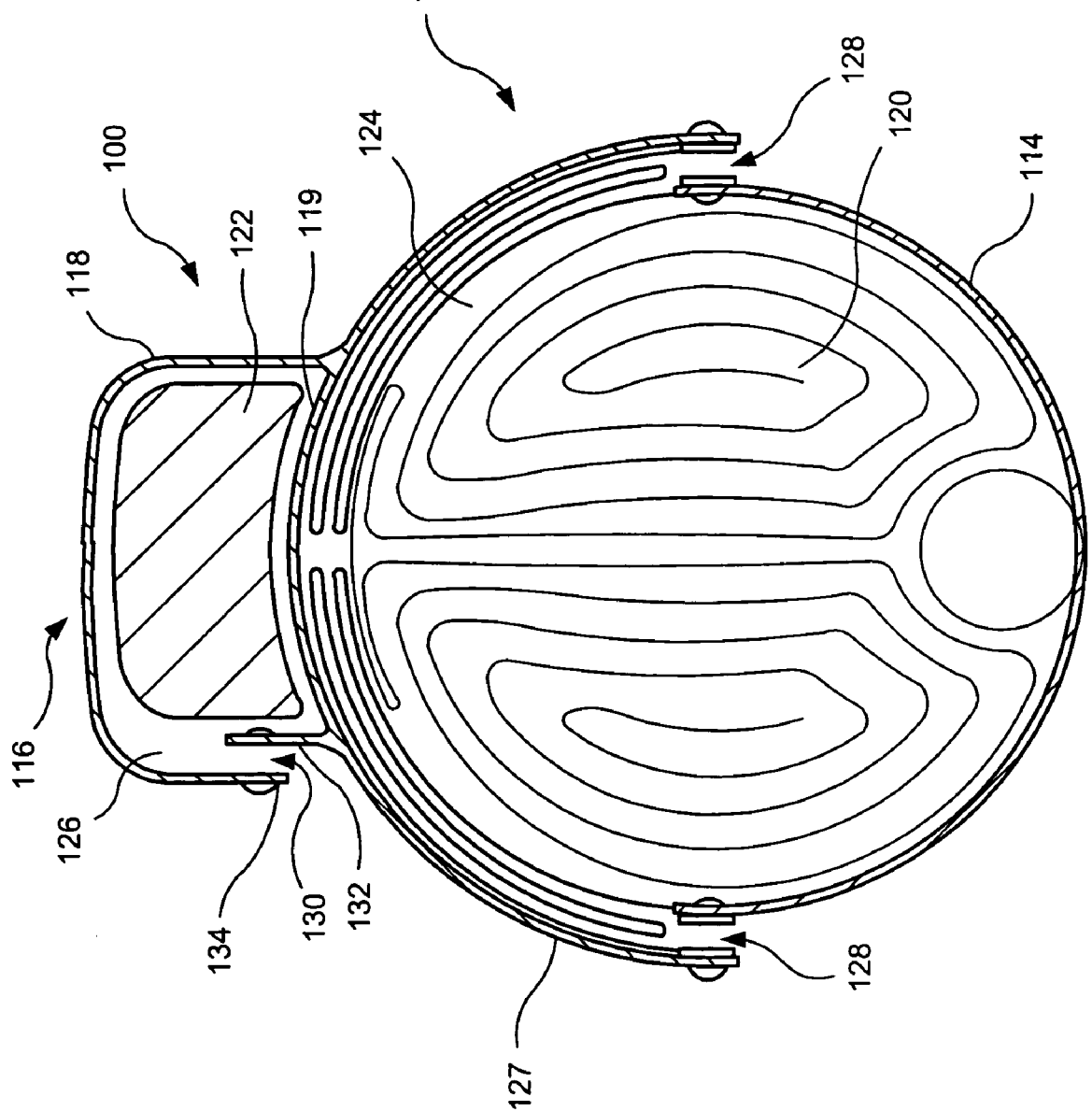
FIG. 5 is a section view according to section line 5-5 of the FIG. 4.

Referring now to FIGS. 4-7, wherein the integrated emergency floatation system 100 of the invention is adaptable for retrofitting the existing floatation arrangements of a rotorcraft. In FIGS. 4 and 5 the stowed condition of the system 100 is shown consisting of the raft module 116 associated with the float unit 112. In the float unit 112, a float compartment 124 adapted to receive a float 120 is formed between a float cover 114 and the base plate 119. The raft module 116 is generally formed by a raft cover 118 which is supported by the base plate 119, so as to define a substantially hollow raft compartment 126 adapted to receive a raft 122 in a packed condition thereof. A securing member 132 can be provided to extend outward from the base plate 119, so as to be formed for releasable engagement with an outer end 134 of the raft cover 118. It will be discussed in greater detail hereinbelow that the support plate 119 serves an important function and operates as a substantially rigid backbone which keeps the entire integrated system in place. A raft securing arrangement 130 is provided at an area of engagement between the outer end 134 and the member 132. Although the raft securing arrangement 130 has been illustrated in the form of releasable members or rivets, it is to be understood that any conventional securing arrangement assuring reliable closure of the raft compartment 126 and quick release of the raft 122 is within the scope of the invention.

Figure 6:
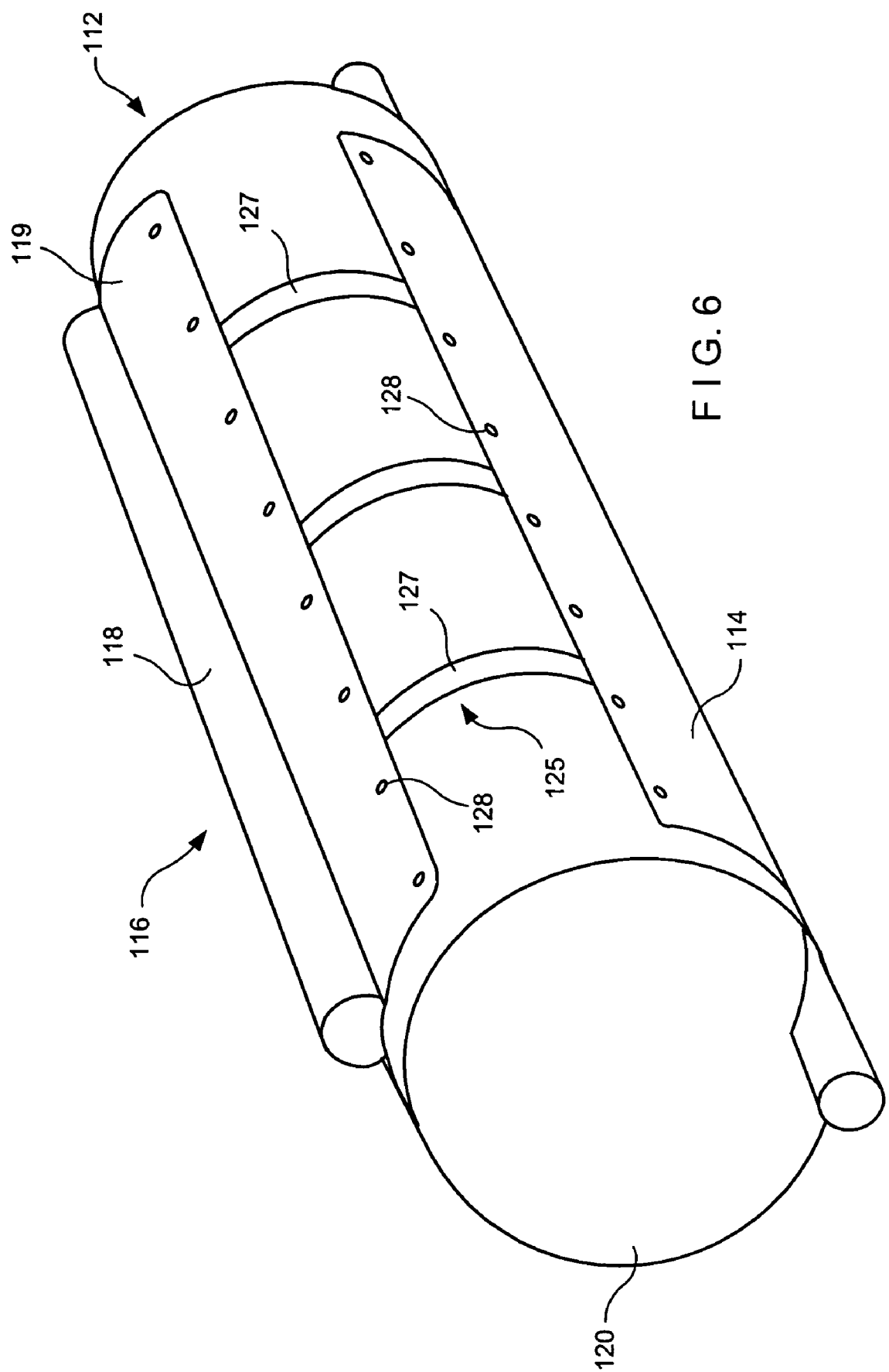
FIG. 6 shows the emergency floatation system of FIG. 4 with the float being deployed.
Figure 7:
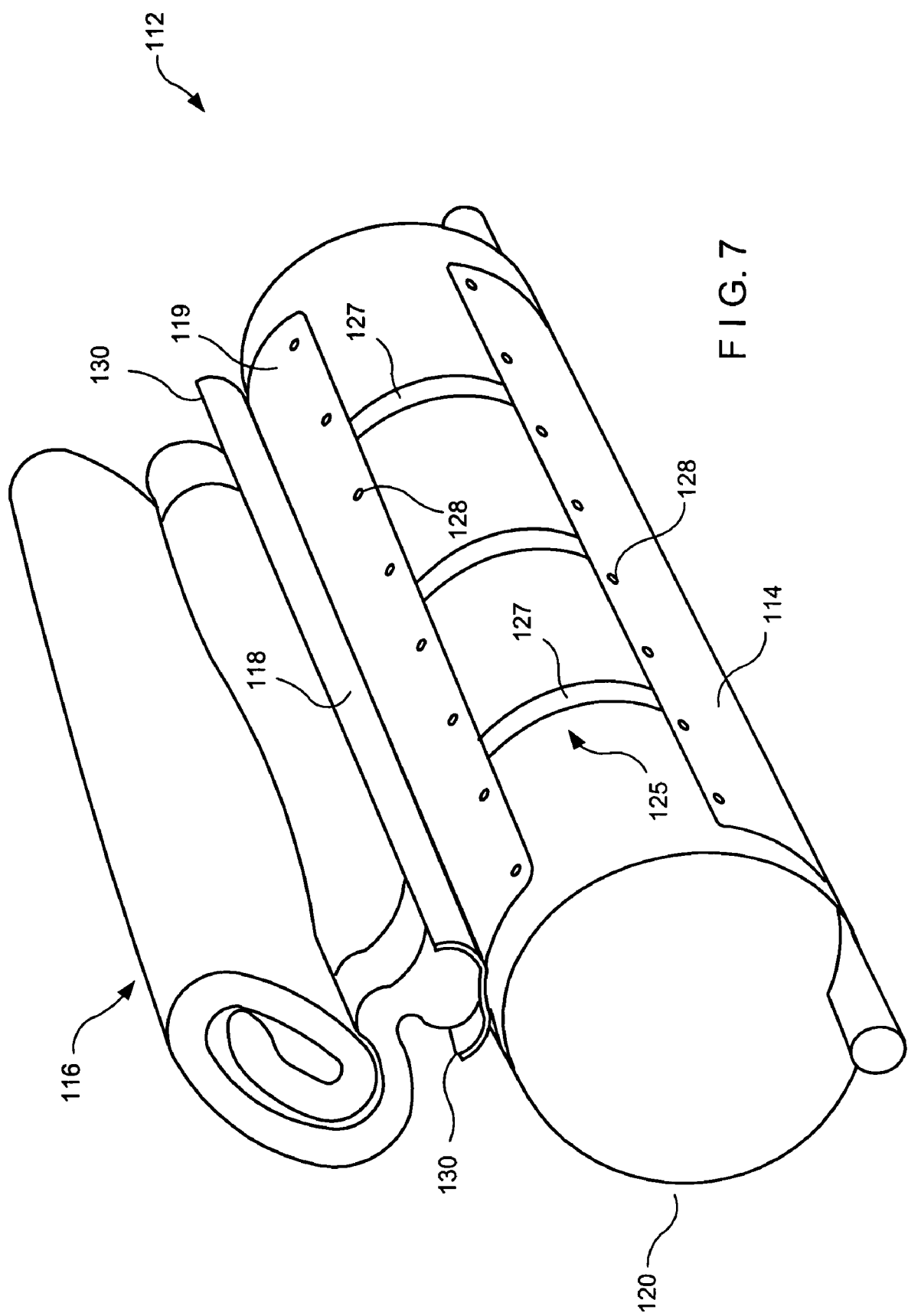
FIG. 7 is a semi-perspective view showing deployment of the life-raft.
Figure 8:
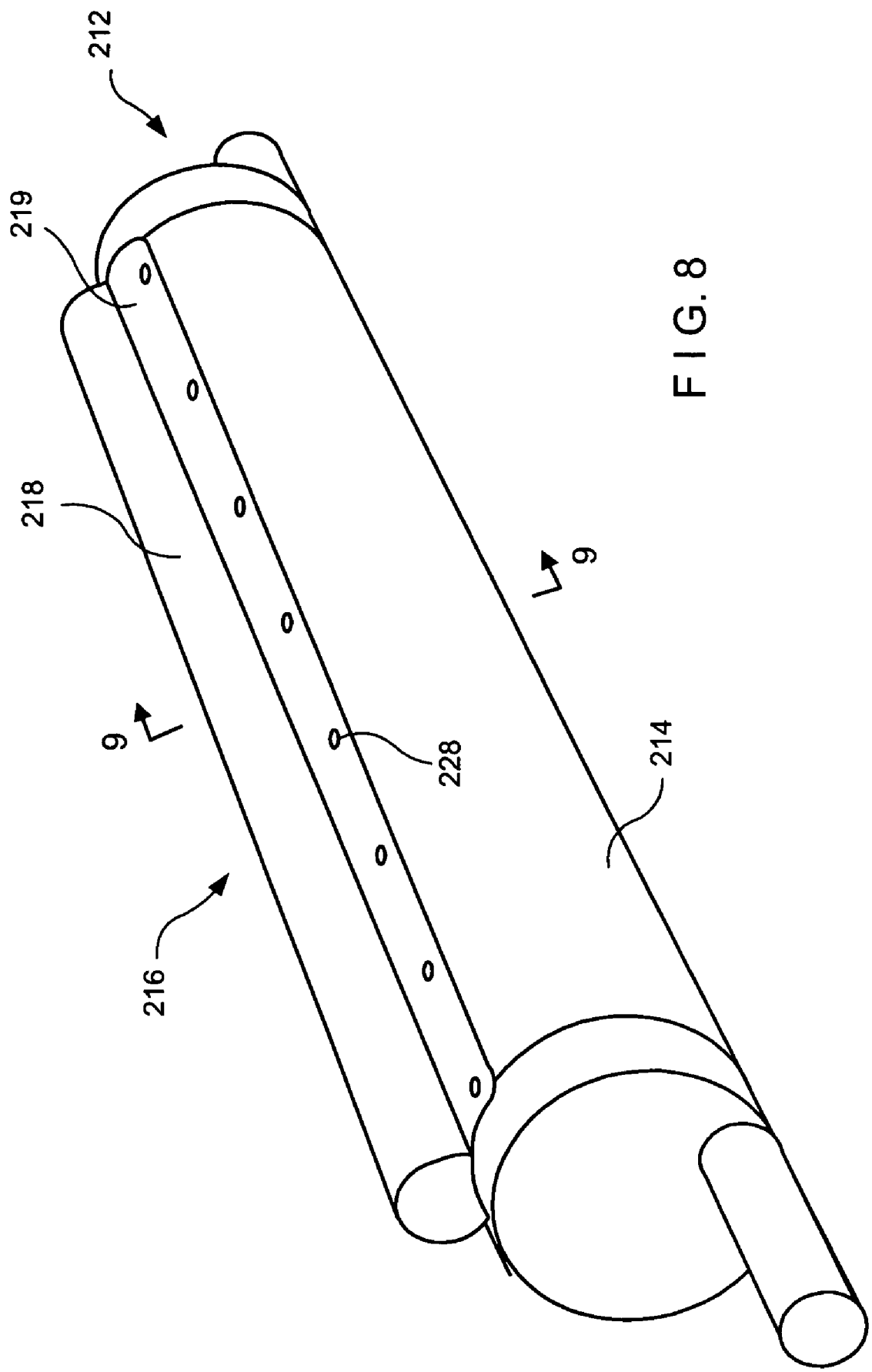
FIG. 8 is a semi-perspective view of another embodiment of the packed emergency floatation system of the invention.

In the float unit 112, the float cover 114 forms a bottom portion and the base plate 119 serves as a top portion of the float compartment 124. To assure proper and secure positioning of the raft module with respect to the float unit, a retention arrangement 125 is provided on both sides of the system, extending between the base plate 119 and the float cover 214. As best illustrated in FIGS. 4, 6, and 7, the retention arrangement 125 can be in the form of a plurality of flexible retention members or straps 127 which are spaced from each other in the longitudinal direction of the system 100. One end of each retention strap is attached to an inner surface of the base plate 119, whereas the other end thereof is connected to either the float 120 or the interior of the raft cover 114. Upon deployment of the float 120, the retention straps 127 are disposed along side regions thereof, so as to extend between a bottom region of the base plate 119 and a top region of the float cover 214, as illustrated in FIGS. 8 and 7.

As best illustrated in FIGS. 4 and 5, a float securing arrangement 128 is provided to contain the packed float 120 within the float compartment 124 and secure the connection between the float cover 114 and the base plate 119. The float securing arrangement 128 is shown in the form of matching sets of releasable members symmetrically disposed at an interface between the float cover 114 and the base plate 119 and disposed on both sides of the float unit 212. However, it should be noted that the securing arrangement can be positioned on one side of the float unit 212 and can be in the form of any conventional fastening arrangement, including but not limited to a daisy chain, Velcro, adhesives, etc.

After the packed float 120 is positioned within the float compartment 124 and the float securing arrangement 128 has been properly engaged, the float unit 112 is being configured as an elongated element with the raft module 116 longitudinally extending along its top area. In the packed condition of the system 100 (see FIG. 5), the flexible retention straps 127 are disposed within the float compartment 124 between an inner surface of the base plate 119 and the float 212.

As best illustrated in FIG. 6, in order to achieve deployment of the float unit 112, the float 120 is being inflated and the float securing arrangement 128 released. Expansion of the float 120 causes separation of the base plate 119 and the float cover 114 as well as expansion of the flexible retention members or straps 127. In this manner, the inner surface of the base plate 119 and the inner surface of the float cover 114 closely engage the respective outer surfaces of the deployed float 120. The retention straps 127 extending between the base plate 119 and the float cover 114 closely engage side regions of the inflated float 120, so as to keep the raft module 116 in a predetermined position at the top area of the inflated float 120.

The life-raft 122 and the float 120 can be made of urethane covered nylon cloth, as is common in the industry. In one embodiment, the base plate 119 is made of material having rigidity greater than the rigidity of the cloth used to manufacture the floats and rafts. In the deployed condition, see FIGS. 7 and 8 for example, the semi-rigid base plate 119 extends over the top region of the float. In the stowed conditions the semi-rigid base plate 119 engages closely over the top region of the respective float unit 112. Thus, the support plate 119 operates as a rigid backbone which in combination with the float cover 114 and the retention arrangement 125 keep the life-raft module 116 in its place at the top of the float unit 112. In this manner, the raft module 116 is simply and reliably retained at the predetermined position and is adapted for independent and secure deployment of the raft 122.

In the stowed condition of the raft 122, the raft securing arrangement 130 is engaged, so as to keep the raft compartment 126 closed. The raft securing arrangement 130 is completely independent from the activating devices associated with the float unit 112. Thus, activation of the raft 122 does not depend on the deployment of the float 122.

Significantly, in the integrated system 100 of the invention, the raft module 116 is retained in its position and connected to the float unit 112 by means of engagement of the base plate 119, the retention arrangement 125, and the float cover 114 with the float 120. In this manner, the raft module 116 containing the raft 122 can be simply and reliably attached to practically any existing emergency floatation device of the rotorcraft. Independent deployment of the life-raft 122 is possible due to the formation of the raft compartment 126 with its own quick release arrangement 130 provided for such purposes.

As illustrated in FIG. 6, the float 120 can be deployed independently of the life-raft module 116. In this condition, the raft module 116 containing the packed raft (not shown) is securely fastened at the top portion of the inflated float 120.

The independent deployment of the raft 122 is shown in FIG. 7. To accomplish this task, upon inflation of the raft 122, the raft securing arrangement 130 is disengaged, releasing the raft from the raft compartment 126.

As indicated hereinabove, the emergency floatation system 100 illustrated in FIGS. 4-7 is adaptable for retrofitting emergency floatation systems of the existing rotorcraft. This approach substantially simplifies the approval procedure of the system by federal regulatory agencies such at the FAA. The above discussed retrofitted embodiment makes possible utilization of the raft module of the invention with existing emergency floatation arrangements of such aircraft as for example, the EC120, EC130, and AS350. As the existing emergency floatation arrangements do not include life-raft modules, such arrangements can be retrofitted by means of this simple procedure and utilized as a part of the emergency system of the present invention. In the retrofitted embodiment as shown in FIGS. 4-7, the raft module 116 is not permanently attached to the float 120. Rather, it is attached by means of the retention arrangement or strappings 127. This occurs without any substantial modifications to the existing floats. The advantage of this approach is that the existing floats are typically aerodynamically designed and are not changed during the retrofitting process. The integrated emergency evacuation system 100 can be placed practically on any emergency floatation system of existing helicopters.

Figure 9:
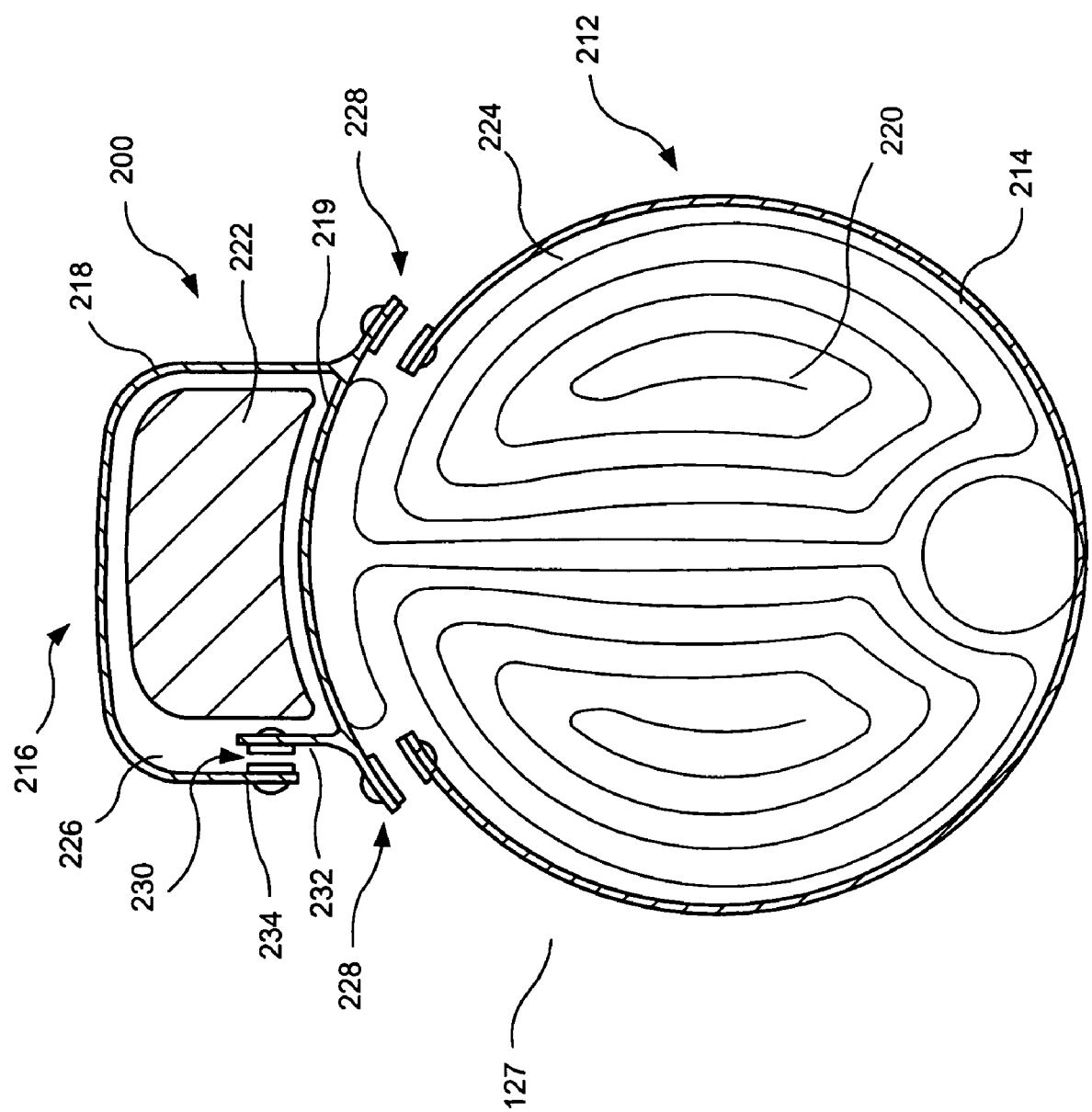
FIG. 9 is a section view according to section line 9-9 of FIG. 8.

Referring now to FIGS. 8-11, which illustrate another embodiment of the emergency floatation system 200 of the invention. More specifically, reference is made now to FIGS. 8 and 9 showing the stowed condition of the system 200. Similar to the previously discussed embodiment, the system 200 consists of the raft module 216 associated with the respective float unit 212. The float unit 212 is formed by a float cover 214 which, along with the base plate 219 is configured to form the float compartment 224 which is adapted to receive the float 220. A float securing arrangement 228 is provided for containment of the packed float 220 within the float compartment 224 and to secure connection between the float cover 214 and the base plate 219. The raft module 216 is generally formed by the raft cover 218 and the base plate 219 which are arranged so as to define a substantially hollow raft compartment 226 provided to receive a raft 222 in a packed condition thereof. The securing member 232 extends outwardly from the base plate 219 and is adapted for releasable engagement with the outer end 234 of the raft cover 218.

Significantly, in this embodiment of the emergency floatation system 200, the raft module 216 is permanently connected to the float 220 at the bottom part of the base 219. In this manner, an inseparable integral structure is formed between the raft module 216 and the float unit 212. Such permanent connection between the elements of the emergency floatation system is considered to be a significant change and requires new certification by the FAA. Therefore, this embodiment cannot be utilized for retrofitting the existing emergency floatation systems. The base 219 and the float 220 can be directly attached to each other by means of cementing, thermal bonding, or any other means capable of providing a secure attachment between two fabrics. As is typical in the industry, a standard urethane nylon cloth is used for production of the raft, float units, and other elements of the invention.

The uniqueness of the emergency floatation system 200 is that it provides a structure which integrates two components which are compact in their storage and are adapted for independent deployment. In spite of being integrated in one structural system 200, each inflatable is capable of having independent deployment. In other words, either the float 220 disposed within the float compartment 224 or the raft 222 disposed within the raft compartment 226 can be independently deployed. The independent deployment of the raft 222 is possible due to the raft compartment 226 being independent from the float compartment 224. Separation of the raft compartment 226 from the float compartment 224 is achieved by utilizing the base plate 219 to form an integral part of both raft module 216 and float unit 212. Deployment of the float 220 occurs upon its inflation, accompanied by the release of the float securing arrangement 228. Deployment of the raft 222 is facilitated by the release of the raft securing arrangements 230. The raft securing arrangement 230 is provided on a side of the raft module 216 facing the exterior of the rotorcraft. Thus, as illustrated in FIG. 3, there is no interference between the raft, the landing gear, or other structural elements of the rotor craft.

A stowed condition of the system 200 is shown in FIGS. 8 and 9. The packed float 220 is positioned within the float compartment 224 with the packed raft 222 being situated within the raft compartment 226 of the raft module 216.

Figure 10:
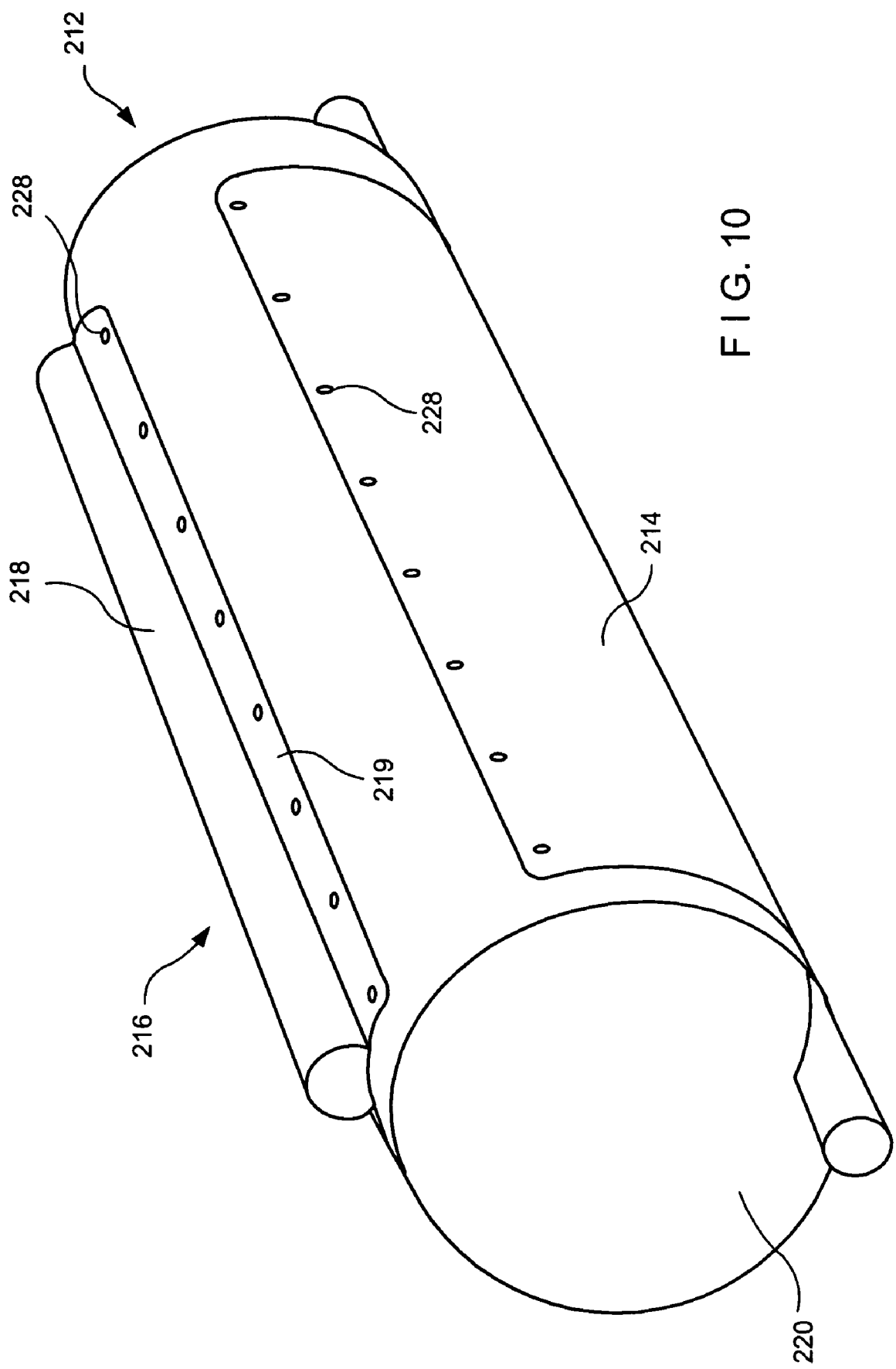
FIG. 10 shows the emergency floatation system of FIG. 8 with the float being deployed.

FIG. 10 illustrates the emergency floatation system 200 with an inflated condition of the float 220. During deployment of the float 220, the float securing arrangement 228 is released. The raft module 216 containing the packed raft (not shown) remains attached at an upper portion of the float. In this condition, the float cover 214 is spaced from the base 219 of the raft module.

Figure 11:
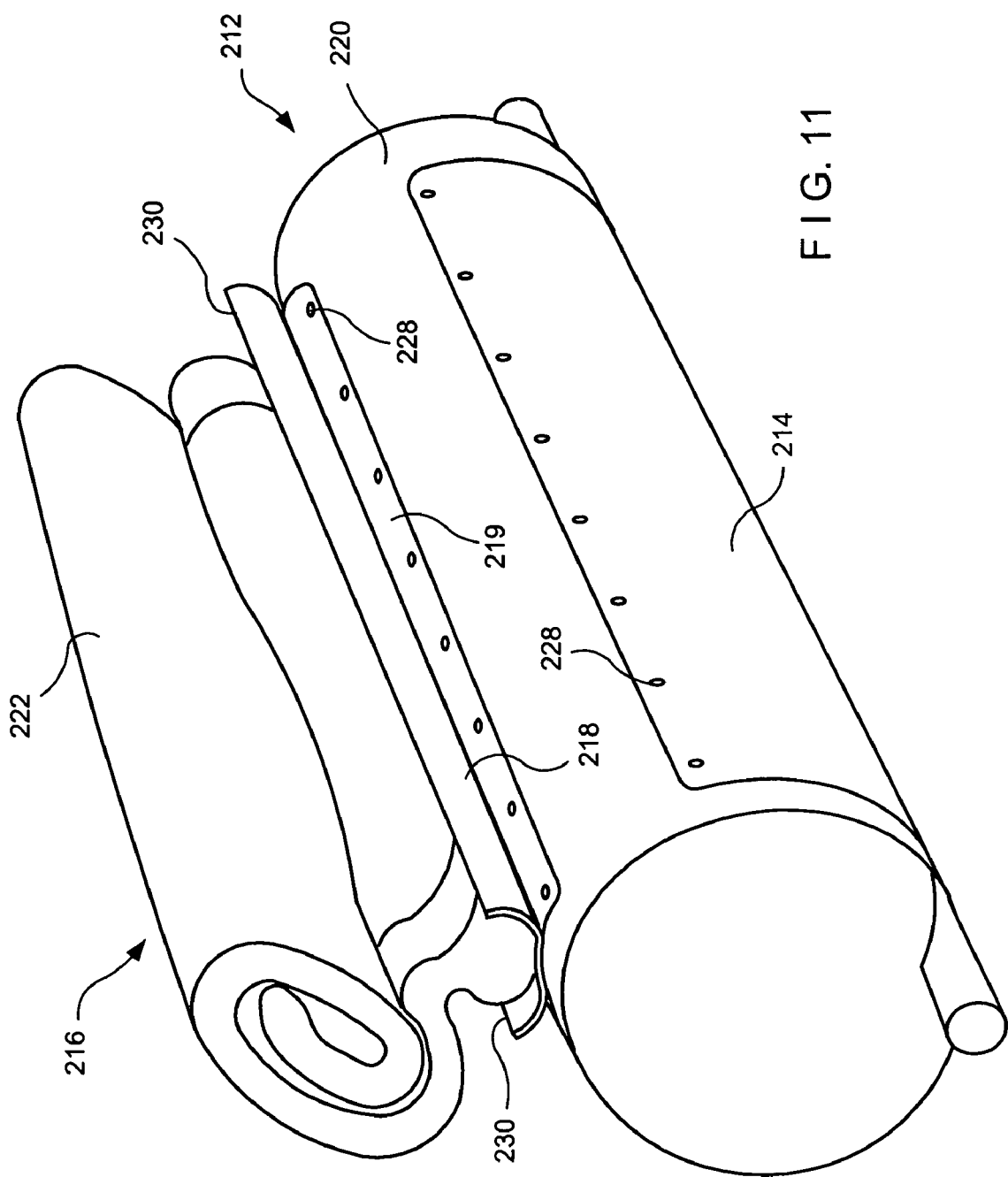
FIG. 11 is a semi-perspective view of the system showing deployment of the life-raft.

FIG. 11 illustrates a further condition of the system 220 of the invention, wherein the raft securing arrangement 230 is being released and the raft 222 is being shown at the initial stages of its deployment. The raft module 216, including the base plate 219 and the raft cover 218, form the raft compartment 226 and remain permanently connected to the upper portion of the float 220.

What is claimed is:

1. An emergency floatation system associated with a landing gear of a rotor craft, comprising:
   at least one float unit formed by at least a base and a float cover with an inflatable float being positioned therebetween;
   a raft module having a raft compartment adapted to received an inflatable raft in a packed condition thereof, said raft module being supported on said float unit by said base; and
   a retention arrangement extending between said base and said float cover for stably retaining said raft module in a predetermined position on said float unit;
   whereby said raft is adapted for inflation and deployment from said raft compartment independently of deployment of said float.

2. The emergency floating system of claim 1, wherein said raft module further comprises a raft cover and a raft securing arrangement formed between said raft cover and said base, so that said raft is being deployed from said raft compartment by releasing said raft securing arrangement.

3. The emergency floatation system of claim 2, wherein said float unit further comprises a float securing arrangement provided to contain said float in the packed condition thereof within said float unit, so as to secure connection between said float cover and said base.

4. The emergency floatation system of claim 3, wherein said float securing arrangement is provided on at least one side of said float unit.

5. The emergency floatation system of claim 4, wherein said float securing arrangement is provided on both sides of the float unit.

6. The emergency floatation system of claim 3, wherein said inflatable float is being deployed from said float unit upon releasing of said float securing arrangement.

7. The emergency floatation system of claim 1, wherein said retention arrangement comprises a plurality of spaced from each other flexible retention members.

8. The emergency floatation system of claim 7, wherein during deployment said float is being inflated so as to cause separation of said base and said float cover as well as expansion of the retention members.

9. The emergency floatation system of claim 8, wherein in the deployed condition of said float an inner area of said base engages a top segment of said float, an inner area of said float cover engages a bottom segment of said float and said retention members extend between the base and the float cover along side regions of the float.

10. The emergency floatation system of claim 3, wherein said raft securing arrangement is operated independently of said float securing arrangement so as to facilitate said independent deployment of said raft and said float.

11. An emergency floatation system associated with a landing gear of a rotorcraft comprising:
    at least one float unit formed by at least a base and a float cover with an inflatable float being positioned therebetween;
    a raft module having a raft compartment adapted to receive an inflatable raft in a packed condition thereof, said raft module being supported on said float unit by said base,
    whereby said raft is adapted for inflation and deployment from said raft compartment independently of inflation and deployment of said float.

12. The emergency floatation system of claim 11, wherein said raft module is being fixedly connected to said float unit.

13. The emergency floating system of claim 11, wherein said float is fixedly connected to the base, said raft module further comprises a raft cover and a raft securing arrangement formed between said raft cover and said base, so that said raft is being deployed from said raft compartment by releasing said raft securing arrangement.

14. The emergency floatation system of claim 13, wherein said float unit further comprises a float securing arrangement provided to contain said float in the packed condition thereof within said float unit, so as to secure connection between said float cover and said base.

15. The emergency floatation system of claim 14, wherein said float securing arrangement is provided on at least one side of said float unit.

16. The emergency floatation system of claim 15, wherein said float securing arrangement is provided on both sides of the float unit.

17. The emergency floatation system of claim 14, wherein said inflatable float is being deployed from said float unit upon releasing of said float securing arrangement.

18. The emergency floatation system of claim 17, wherein during deployment said float is being inflated so as to cause separation of said base and said float cover.

19. The emergency floatation system of claim 18, wherein in the deployed condition of said float, an inner area of said base engages a top segment of said float and in inner area of said float cover engages a bottom segment of said float.

20. The emergency floatation system of claim 14, wherein said raft securing arrangement is operated independently of said float securing arrangement so as to facilitate said independent deployment of said raft and said float.

* * * * *